(12) United States Patent
Li et al.

(10) Patent No.: US 12,567,429 B2
(45) Date of Patent: Mar. 3, 2026

(54) VOICE CALL CONTROL METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventors: Juanjuan Li, Shenzhen (CN); Xianjun Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 327 days.

(21) Appl. No.: 17/974,455

(22) Filed: Oct. 26, 2022

(65) Prior Publication Data

US 2023/0051413 A1    Feb. 16, 2023

Related U.S. Application Data

(63) Continuation of application No. PCT/CN2022/072460, filed on Jan. 18, 2022.

(30) Foreign Application Priority Data

Jan. 21, 2021    (CN) .......................... 202110083388.6

(51) Int. Cl.
*G10L 21/0272*    (2013.01)
*G10L 15/02*    (2006.01)
(Continued)

(52) U.S. Cl.
CPC .......... *G10L 21/0272* (2013.01); *G10L 15/02* (2013.01); *G10L 15/16* (2013.01);
(Continued)

(58) Field of Classification Search
CPC ..... G10L 21/0272; G10L 15/02; G10L 15/16; G10L 15/22; H04L 65/403; H04M 3/568; H04M 9/085
See application file for complete search history.

(56) References Cited

U.S. PATENT DOCUMENTS 11,862,168 B1 * 1/2024 Leblang ................ H04M 3/568
2009/0041271 A1 * 2/2009 Pallone ................. H04M 7/006
381/300
(Continued)

FOREIGN PATENT DOCUMENTS

CN        108449496 A    8/2018
CN        109410978 A    3/2019
(Continued)

OTHER PUBLICATIONS

Tencent Technology, ISR, PCT/CN2022/072460, Apr. 15, 2022, 2 pgs.
(Continued)

*Primary Examiner* — Andrew C Flanders
*Assistant Examiner* — Cameron Kenneth Young
(74) *Attorney, Agent, or Firm* — Morgan, Lewis & Bockius LLP

(57) ABSTRACT

Embodiments of this application provide a real-time voice call control method performed by an electronic device. The method includes: obtaining a mixed call voice in real time during a cloud conference call, where the mixed call voice includes at least one branch voice; determining energy information corresponding to each frequency point of the call voice in a frequency domain; determining an energy proportion of each branch voice at each frequency point in total energy of the frequency point based on the energy information at the frequency point; determining a quantity of branch voices comprised in the call voice based on the energy proportion of each branch voice at each frequency
(Continued)

Portable computer 103

Network 104

Server 105

Tablet computer 102

Smart phone 101 point; and controlling the voice call by setting a call voice control manner based on the quantity of branch voices.

9 Claims, 12 Drawing Sheets

(51) Int. Cl.

| | |
|---|---|
| *G10L 15/16* | (2006.01) |
| *G10L 15/22* | (2006.01) |
| *H04L 65/403* | (2022.01) |
| *H04M 3/56* | (2006.01) |
| *H04M 9/08* | (2006.01) |

(52) U.S. Cl.

CPC ............ *G10L 15/22* (2013.01); *H04L 65/403* (2013.01); *H04M 3/568* (2013.01); *H04M 9/085* (2013.01)

(56) References Cited

U.S. PATENT DOCUMENTS

| | | | | |
|---|---|---|---|---|
| 2015/0381132 A1* | 12/2015 | Hayashi | .............. | G10L 21/0316 |
| | | | | 381/107 |
| 2016/0064000 A1* | 3/2016 | Mizumoto | .............. | G10L 17/02 |
| | | | | 704/233 |

| | | | | |
|---|---|---|---|---|
| 2017/0084287 A1* | 3/2017 | Kim | .................... | G10L 21/0208 |
| 2017/0270930 A1* | 9/2017 | Ozmeral | ................. | H04M 3/56 |
| 2018/0068675 A1 | 3/2018 | Variani et al. | | |
| 2019/0318757 A1* | 10/2019 | Chen | ....................... | G10L 17/18 |
| 2020/0126581 A1* | 4/2020 | Chintala | ............. | G10L 21/0208 |
| 2020/0336522 A1* | 10/2020 | Newin | ................. | H04M 3/002 |
| 2021/0020161 A1* | 1/2021 | Gao | ........................ | G10L 13/00 |
| 2022/0199099 A1* | 6/2022 | Li | ....................... | G10L 21/0308 |

FOREIGN PATENT DOCUMENTS

| | | | |
|---|---|---|---|
| CN | 109830245 A | 5/2019 |
| CN | 110197665 A | 9/2019 |
| CN | 110970053 A | 4/2020 |
| CN | 111048119 A | 4/2020 |
| CN | 111402898 A | 7/2020 |
| CN | 112116920 A | 12/2020 |
| CN | 112133324 A | 12/2020 |
| CN | 113571082 A | 10/2021 |
| JP | 2013011680 A | 1/2013 |

OTHER PUBLICATIONS

Tencent Technology, WO, PCT/CN2022/072460, Apr. 15, 2022, 5 pgs.

Tencent Technology, IPRP, PCT/CN2022/072460, Jul. 20, 2023, 6 pgs.

* cited by examiner

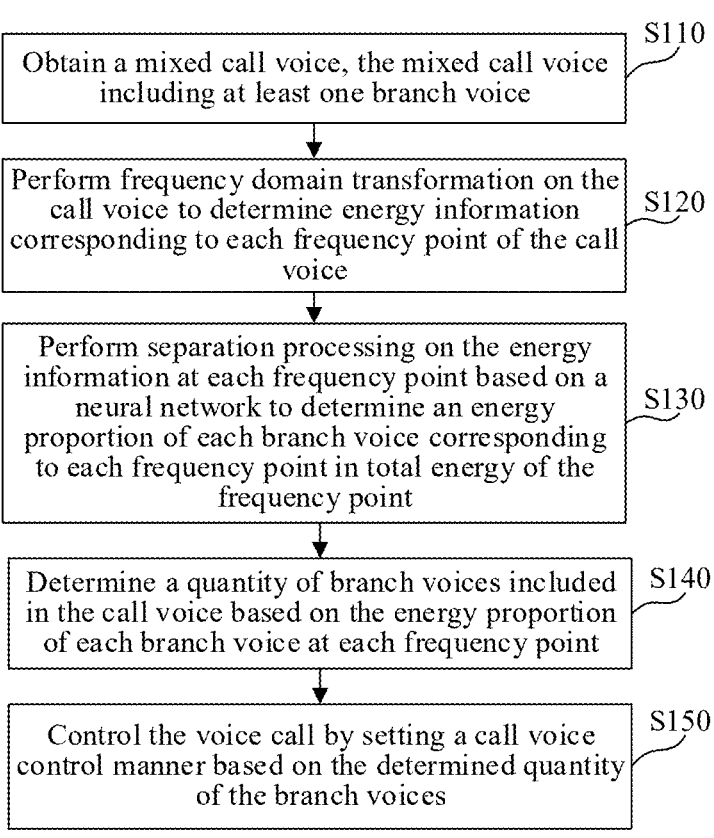

| Obtain a mixed call voice, the mixed call voice including at least one branch voice | S110 |

| Perform frequency domain transformation on the call voice to determine energy information corresponding to each frequency point of the call voice | S120 |

| Perform separation processing on the energy information at each frequency point based on a neural network to determine an energy proportion of each branch voice corresponding to each frequency point in total energy of the frequency point | S130 |

| Determine a quantity of branch voices included in the call voice based on the energy proportion of each branch voice at each frequency point | S140 |

| Control the voice call by setting a call voice control manner based on the determined quantity of the branch voices | S150 |

FIG. 3

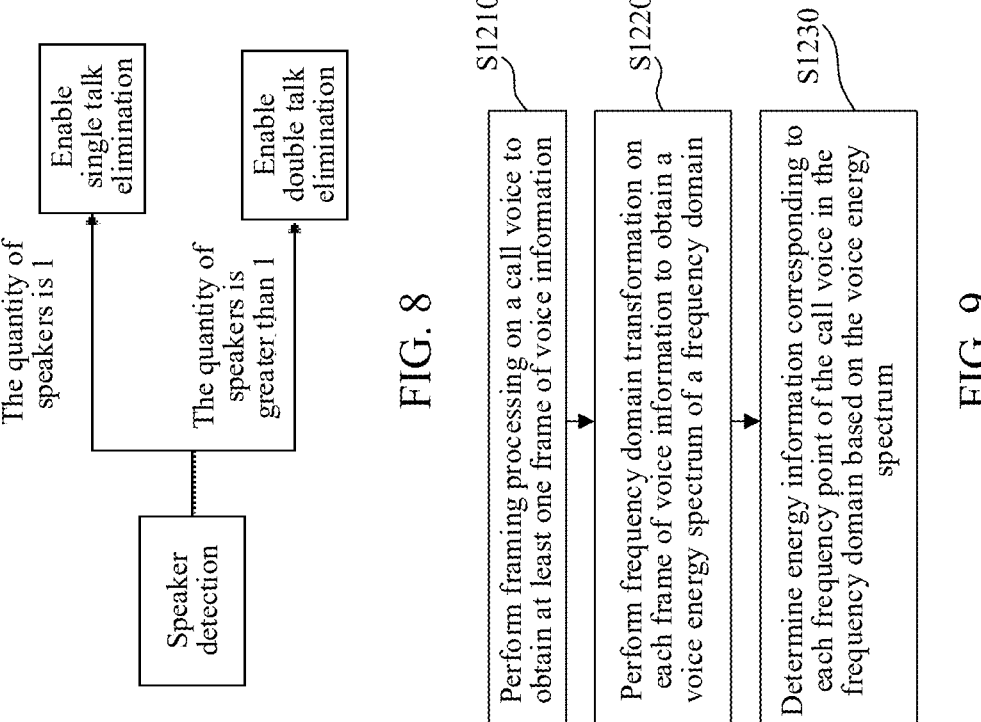

FIG. 8

Perform framing processing on a call voice to obtain at least one frame of voice information | S1210

Perform frequency domain transformation on each frame of voice information to obtain a voice energy spectrum of a frequency domain | S1220

Determine energy information corresponding to each frequency point of the call voice in the frequency domain based on the voice energy spectrum | S1230

FIG. 9

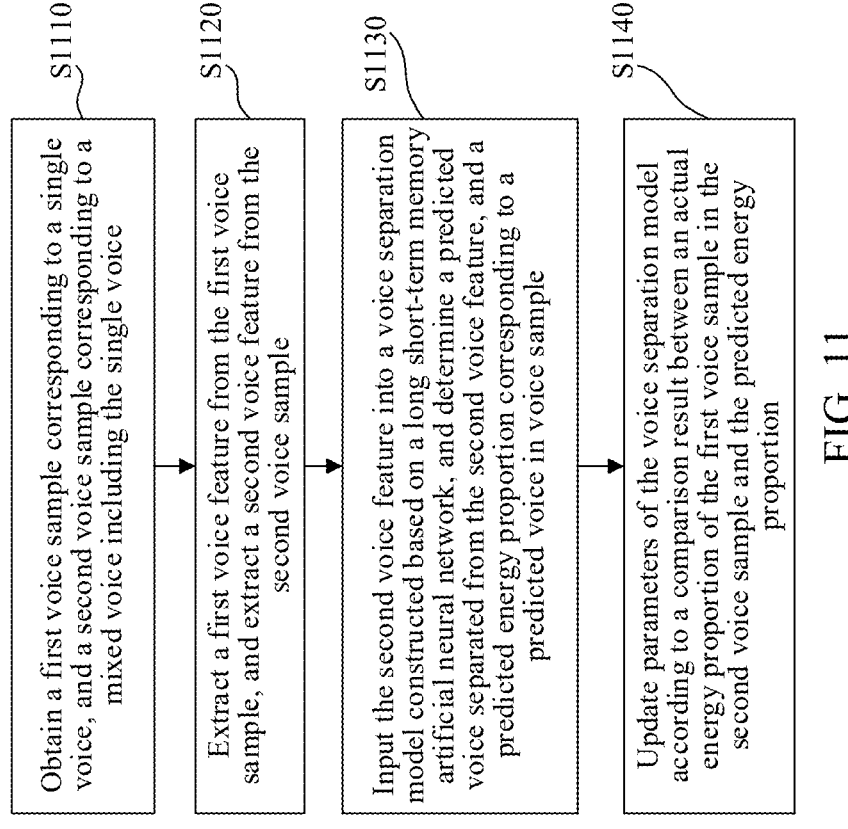

S1110

Obtain a first voice sample corresponding to a single voice, and a second voice sample corresponding to a mixed voice including the single voice

S1120

Extract a first voice feature from the first voice sample, and extract a second voice feature from the second voice sample

S1130

Input the second voice feature into a voice separation model constructed based on a long short-term memory artificial neural network, and determine a predicted voice separated from the second voice feature, and a predicted energy proportion corresponding to a predicted voice in voice sample

S1140

Update parameters of the voice separation model according to a comparison result between an actual energy proportion of the first voice sample in the second voice sample and the predicted energy proportion

FIG. 11

VOICE CALL CONTROL METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2022/072460, entitled "VOICE CALL CONTROL METHOD AND APPARATUS, AND COMPUTER-READABLE MEDIUM AND ELEC-TRONIC DEVICE" filed on Jan. 18, 2022, which claims priority to Chinese Patent Application No. 202110083388.6, filed with the State Intellectual Property Office of the People's Republic of China on Jan. 21, 2021, and entitled "VOICE CALL CONTROL METHOD AND APPARATUS, COMPUTER-READABLE MEDIUM, AND ELEC-TRONIC DEVICE", all of which are incorporated herein by reference in their entirety.

FIELD OF THE TECHNOLOGY

This application relates to the field of computer technolo-gies, and specifically, to a voice call control method and apparatus, a computer-readable medium, and an electronic device.

BACKGROUND OF THE DISCLOSURE

In many voice call scenarios, the quantity of speakers or the timbre of speakers needs to be discriminated for subse-quent voice control. In the related art, a speaker scenario detection system is trained based on a large quantity of labeled voice segments, where a label of each segment is the quantity of speakers. A voice segment is given during testing, and the system predicts the current quantity of speakers. Such a processing manner causes a relatively long delay for voice detection, especially in a real-time commu-nication scenario, which greatly reduces the efficiency of voice recognition and affect the effect of real-time voice control.

SUMMARY

Embodiments of this application provide a voice call control method and apparatus, a computer-readable medium, and an electronic device, which can ensure the accuracy of detecting the quantity of people in a voice call at least to a certain extent, and simultaneously improve the efficiency of recognizing the quantity of people in a voice call and the efficiency of controlling the voice call.

Other features and advantages of this application become obvious through the following detailed descriptions, or may be partially learned through the practice of this application.

According to an aspect of this embodiment of this appli-cation, a real-time voice call control method is provided, including: obtaining a mixed call voice, the mixed call voice including at least one branch voice; determining energy information corresponding to each frequency point of the call voice in a frequency domain; determining an energy proportion of each branch voice at each frequency point in total energy of the frequency point based on the energy information at the frequency point; determining a quantity of branch voices included in the call voice based on the energy proportion of each branch voice at each frequency point; and controlling the voice call by setting a call voice control manner based on the quantity of the branch voices.

According to an aspect of this embodiment of this appli-cation, a voice call control apparatus is provided, including: an obtaining unit, configured to obtain a mixed call voice, the mixed call voice including at least one branch voice; a transform unit, configured to determine energy information corresponding to each frequency point of the call voice in a frequency domain; a separation unit, configured to deter-mine an energy proportion of each branch voice at each frequency point in total energy of the frequency point based on the energy information at the frequency point; a quantity unit, configured to determine a quantity of branch voices included in the call voice based on the energy proportion of each branch voice at each frequency point; and a control unit, configured to control the voice call by setting a call voice control manner based on the quantity of the branch voices.

According to an aspect of this embodiment of this appli-cation, a non-transitory computer-readable medium is pro-vided, storing a computer program, the computer program, when executed by a processor of an electronic device, causing the electronic device to implement the real-time voice call control method according to this embodiment of this application.

According to an aspect of this embodiment of this appli-cation, an electronic device is provided, including: one or more processors; and a storage apparatus, configured to store one or more programs, the one or more programs, when executed by the one or more processors, causing the electronic device to implement the real-time voice call control method according to this embodiment of this appli-cation.

According to an aspect of this embodiment of this appli-cation, a computer program product or a computer program is provided, the computer program product or the computer program including computer instructions, the computer instructions being stored in a non-transitory computer-read-able storage medium. A processor of a computer device reads the computer instructions from the computer-readable storage medium. The processor executes the computer instructions, to cause the computer device to implement the voice call control method according to various implemen-tations of this application.

It is to be understood that the foregoing general descrip-tions and the following detailed descriptions are merely for illustration and explanation purposes and are not intended to limit this application.

BRIEF DESCRIPTION OF THE DRAWINGS

FIG. 3 is a schematic flowchart of a voice call control method according to some embodiments of this application.

FIG. 8 is a schematic diagram of echo elimination accord-ing to some embodiments of this application.

FIG. 9 is a schematic flowchart of extracting energy information according to some embodiments of this application.

FIG. 11 is a schematic flowchart of training a separation model according to some embodiments of this application.

DESCRIPTION OF EMBODIMENTS

Figure 1:
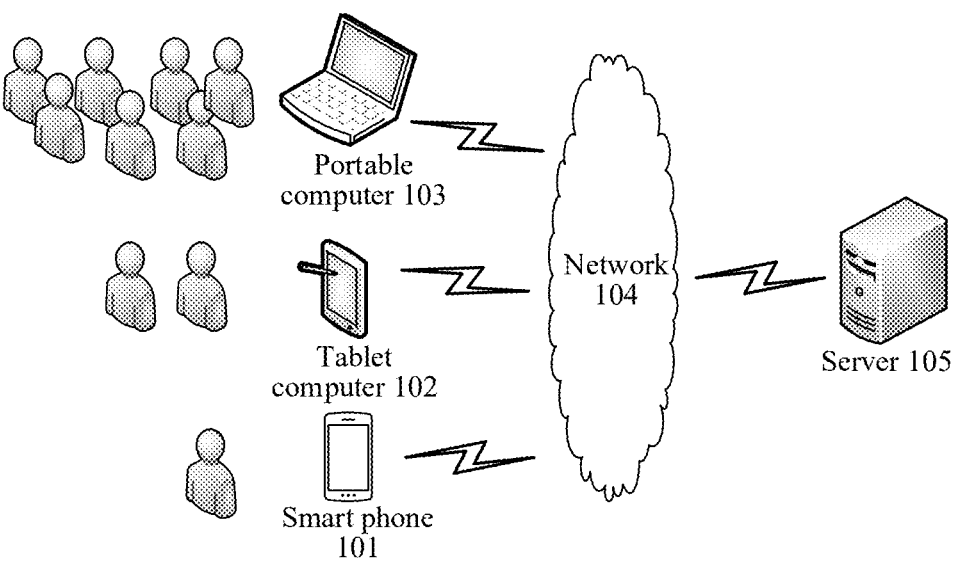
FIG. 1 is a schematic diagram of an exemplary system architecture to which a technical solution according to an embodiment of this application is applicable.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage. As a basic capability provider of cloud computing, a cloud computing resource pool (which is referred to as a cloud platform for short, and is generally referred to as an Infrastructure as a Service (IaaS)) platform is built, and a plurality of types of virtual resources are deployed in the resource pool for external customers to choose for use. The cloud computing resource pool mainly includes: a computing device (a virtualized machine including an operating system), a storage device, and a network device. According to the division of logical functions, a Platform as a Service (PaaS) layer may be deployed on the Infrastructure as a Service (IaaS) layer, and the Software as a Service (SaaS) layer may be deployed on the PaaS layer, or the SaaS layer may be directly deployed on the IaaS layer. PaaS is a platform on which software runs, such as a database and a web container. SaaS is a variety of service software, such as a web portal and an SMS group sender. Generally, SaaS and PaaS are upper layers relative to IaaS.

A cloud call center is a call center system based on the cloud computing technology. An enterprise does not need to purchase any software or hardware systems, but only needs to have basic conditions such as personnel and venues to quickly own a call center belonging to the enterprise. Software and hardware platforms, communication resources, routine maintenance and services are provided by service providers. The cloud call center has a plurality of features such as short construction period, low investment, low risk, flexible deployment, strong system capacity scalability, low operation and maintenance cost and so on. Whether the cloud call center is a telemarketing center or a customer service center, by renting services on demand, the enterprise can build a call center system with comprehensive, stable and reliable functions, where the seats can be distributed all over the country and to receive calls all over the country supporting national call access.

In this embodiment of this application, the cloud call center may be used for calling a center system, and in addition, a voice call control method may be embedded in the system to implement the voice control in a call process, thereby causing the cloud call center to be more intelligent, and improving the reliability and security of the cloud call center.

The cloud conference is an efficient, convenient and low-cost conference form based on the cloud computing technology. Users only need to perform simple and easy operations through Internet interfaces, and can quickly, efficiently and synchronously share voice, data files and videos with teams and customers around the world. Complex technologies such as data transmission and processing in conferences are provided by a cloud conference service provider to assist in operations of help the users to operate. At present, domestic cloud conferences mainly focus on service content of a software as a service (SaaS) mode, including calls, networks, videos and other service forms. Video conferences based on the cloud computing are referred to as cloud conferences. In the era of the cloud conferences, data transmission, processing, and storage are all performed by computer resources of video conference manufacturers providers. The users do not need to purchase expensive hardware or install cumbersome software at all. The users only need to open browsers and log in to corresponding interfaces to conduct efficient teleconferences. A cloud conference system supports multi-server dynamic cluster deployment and provides a plurality of high-performance servers, which greatly improves stability, security and availability of conferences. In recent years, because video conferences can greatly improve communication efficiency, continuously reduce communication costs, and bring an upgrade in internal management level, the video conferences have been welcomed by a plurality of are popular among many users and have been widely used in a plurality of fields such as government, military, transportation, transmission, finance, operators, education, enterprises and so on. There is no doubt that after using the cloud computing, the video conferences will be more attractive competitive in terms of convenience, speed and ease of use, which will surely stimulate arrival of anew upsurge in video conference applications.

In the application scenario of the cloud conference, the voice call control method may be applied to the cloud conference in this embodiment of this application, so that the voice call in a process of the cloud conference is clearer, and a voice communication process is more intelligent, thereby improving the efficiency of the conference.

Cloud social is a virtual social application mode for interactive applications of the Internet of Things, cloud computing, and mobile internet, aims to establish a famous "resource sharing relationship map", and then develops network social. A main feature of the cloud social is the unified integration and evaluation of a large quantity of social resources to form an effective resource pool to provide services to the user on demand. The more users who participate in the sharing, the greater the utilization value that may be created.

Artificial intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making. The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a voice processing technology, a natural language processing technology, and machine learning/deep learning (DL).

Key technologies of the voice technology include an automatic voice recognition (ASR) technology, a text-to-voice (TTS) technology, and a voice print recognition technology. To make a computer capable of listening, seeing, speaking, and feeling is the future development direction of human-computer interaction, and voice has become one of the most promising human-computer interaction methods in the future. Machine learning (ML) is a multi-disciplinary subject involving a plurality of disciplines such as probability theory, statistics, approximation theory, convex analysis, and algorithm complexity theory. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

In the related art, a speaker scenario detection system is trained based on a large quantity of labeled voice segments, where a label of each segment is the quantity of speakers. A voice segment is given during testing, and the system predicts the current quantity of speakers. However, in the solution, more context information is required in a detection process to determine the current quantity of speakers. For example, long-term voice segments need to be collected as a data basis to determine the quantity of speakers. Such a processing manner causes a relatively long delay for voice detection, especially in a real-time communication scenario, which greatly reduces the efficiency of voice recognition and affect the effect of real-time voice control.

The solutions provided in the embodiments of this application involve technologies such as voice technology and machine learning of artificial intelligence. By using the technologies, the voice call control method in this embodiment of this application may be more accurate, which is specifically described by the following embodiments:

FIG. 1 is a schematic diagram of an exemplary system architecture to which a technical solution according to an embodiment of this application is applicable.

As shown in FIG. 1, the system architecture may include a terminal device (which may be any one or more of a smart phone 101, a tablet computer 102, and a portable computer 103 shown in FIG. 1, or certainly may be a desktop computer, and the like), a network 104, and a server 105. The network 104 is configured to provide a medium of a communication link between the terminal device and the server 105. The network 104 may include various connection types, for example, a wired communication link and a wireless communication link.

It is to be understood that the quantities of terminal devices, networks, and servers in FIG. 1 are merely exemplary. There may be any quantities of terminal devices, networks and servers according to an actual requirement. For example, the server 105 may be a server cluster including a plurality of servers.

Each terminal device in this embodiment may be directed to different call clusters, where the quantity of participants in the call cluster may be one, two, or more, or the like. For example, a call cluster targeted by a portable computer 103 may include a plurality of participants, a call cluster targeted by a tablet computer 102 may include other participants, and the user may further participate in a conference through a smart phone 101.

For example, during a conference, a plurality of users or one user may use a terminal device to make a conference call. In addition, a server 105 may obtain a call voice between the terminal devices through a network 104, perform frequency domain transformation on the call voice, and determine energy information corresponding to the call voice in a frequency domain; perform separation processing on the energy information based on a neural network to determine an energy proportion of each branch voice included in the call voice in the call voice; determine a quantity of branch voices included in the call voice based on the energy proportion; and control the voice call by setting a call voice control manner based on the quantity of the branch voices.

In the solution, the call voice is obtained in real time during the call, and frequency domain transformation is performed on the call voice to determine the corresponding energy information of the call voice in the frequency domain. Then, separation processing is performed on the energy information based on the neural network, and the energy proportion of each branch voice included in the call voice in the call voice is determined, so as to determine the quantity of branch voices included in the call voice based on the energy proportion. Finally, based on the quantity of branch voices, the voice call is controlled by setting the call voice control manner, thereby implementing the real-time detection on the quantity of people during the voice call and the real-time control of the voice call. In this way, the accuracy of detecting the quantity of people in the voice call is ensured, and the efficiency of recognizing the quantity of people in the voice call and the efficiency of controlling the voice call are simultaneously improved.

Figure 2:
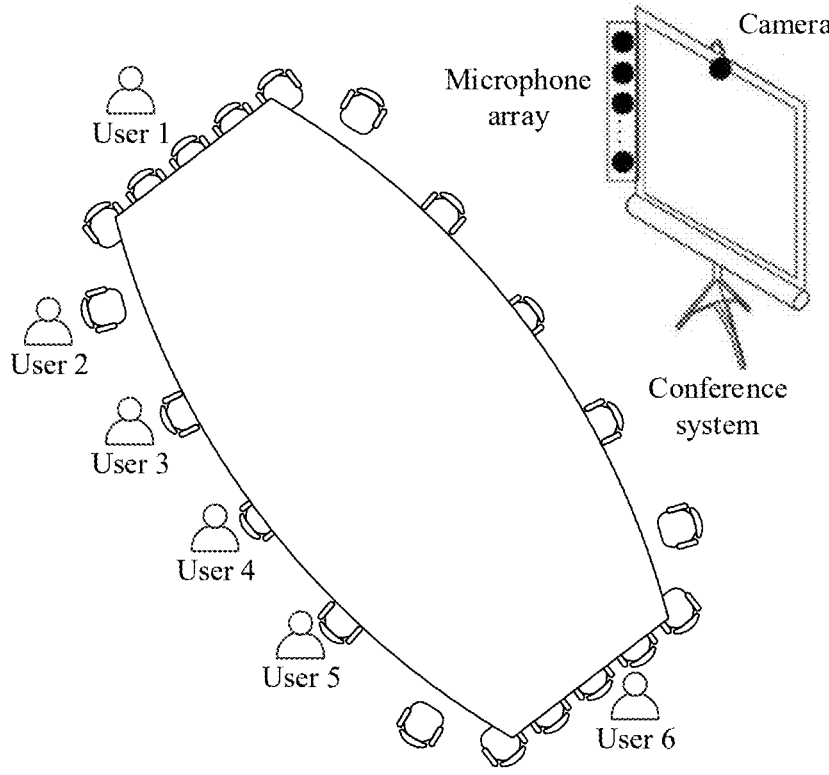
FIG. 2 is a schematic diagram of a conference system according to some embodiments of this application.

In addition, as shown in FIG. 2, in this embodiment, processing may be performed for only one call cluster, and the call cluster includes one, two, or more participants. Through the voice call control method, the real-time quantity of speakers in the call cluster may be detected, and corresponding call control may be performed to ensure the voice quality during the call and improve the call efficiency.

The voice call control method provided in the embodiments of this application is generally performed by the server 105, and accordingly, the voice call control apparatus is generally arranged in the server 105. However, in another embodiment of this application, the terminal device may also have functions similar to those of the server, so as to perform the voice call control solution provided in this embodiment of this application.

The server in this embodiment may be an independent physical server, or may be a server cluster including a plurality of physical servers or a distributed system, or may be a cloud server providing a cloud computing service. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

The implementation details of the technical solution of this embodiment of this application are described in detail as follows:

FIG. 3 is a schematic flowchart of a voice call control method according to an embodiment of the present disclosure. The voice call control method may be performed by a server, and the server may be the server shown in FIG. 1. With reference to FIG. 3, the voice call control method includes at least step S110 to step S150. A detailed description is as follows:

Step S110. Obtain a mixed call voice, the mixed call voice including at least one branch voice.

In some embodiments of this application, the mixed call voice may be obtained during the call in the call cluster. A length of the call voice is not limited in this embodiment, and a frame of call voice, or a call voice with a duration of one second or one minute, or the like may be obtained in real time.

For example, the call may be a real-time communication conference scenario. In a process of the real-time communication conference, the call voice may be collected in real time, corresponding recognition processing is performed based on the collected call voice, and subsequent control is performed based on a generated recognition result, so as to implement the effect of real-time control for the call voice.

Step S120. Perform frequency domain transformation on the call voice to determine energy information corresponding to each frequency point of the call voice.

In an embodiment of this application, the call voice obtained in this embodiment is the call voice in the time domain, which is a voice signal with time as an independent variable and volume as a dependent variable. In this embodiment, after the call voice is obtained, frequency domain transformation is performed on the call voice, and a voice signal in the time domain is converted into a voice signal in the frequency domain, so as to reflect the energy information of the call voice in the frequency domain.

Figures 4, 5:
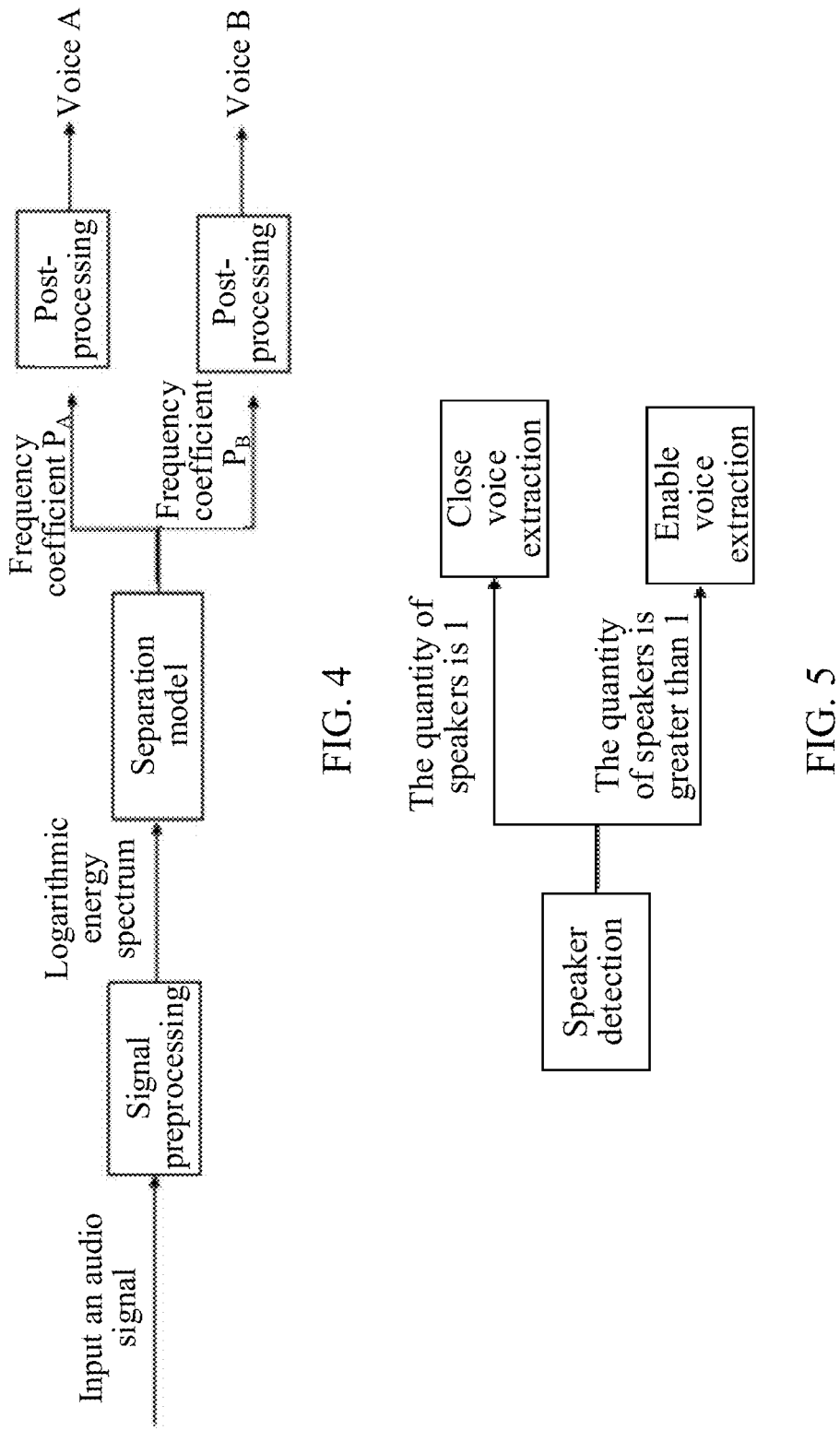
FIG. 4 is a schematic diagram of a voice separation process according to some embodiments of this application.
FIG. 5 is a schematic diagram of voice extraction accord-ing to some embodiments of this application.

As shown in FIG. 4, in a speaker scenario classification framework based on voice separation, and in a "signal preprocessing" stage, an audio signal is obtained in this embodiment of this application, and the audio signal is preprocessed to extract acoustic features. A logarithmic energy spectrum corresponding to the audio signal is generated, which is used as energy information corresponding to each frequency point of the call voice in the frequency domain.

Specifically, the energy information in this embodiment may include information such as an energy value and an energy spectrum corresponding to each frequency point of the call voice. In this embodiment, attributes such as energy of each frequency point may be measured by using the energy information, so as to distinguish the branch voice corresponding to each frequency point based on the energy information.

Step S130. Perform separation processing on the energy information at each frequency point based on a neural network to determine an energy proportion of each branch voice corresponding to each frequency point in total energy of the frequency point.

In an embodiment of this application, after the energy information at each frequency point is obtained, separation processing is performed on the energy information based on the neural network. That is, the energy information is inputted into the trained separation model to obtain the energy proportion of each branch voice at the frequency point, which is also referred to as a frequency point coefficient based on voice separation. For example, in FIG. 4, using two branch voices as an example, frequency point coefficients of the two branch voices at one frequency point may be obtained: a frequency point coefficient $P_A$ and a frequency point coefficient $P_B$. Only two branch voices are used as an example in FIG. 4, and FIG. 4 shows two frequency point coefficients at one frequency point, corresponding to a speaker A and a speaker B respectively. In practical applications, frequency point coefficients obtained at one frequency point are related to the quantity of people simultaneously speaking, which are not limited to two. In addition, each frequency point whose energy value is not 0 obtains a frequency point coefficient based on voice separation.

Specifically, the frequency point coefficient in this embodiment is used for representing a proportion of the energy corresponding to a specific speaker at a frequency point in the total energy information of the frequency point. The idea of voice separation in this embodiment is based on a manner of each frequency point coefficient in the frequency domain. The energy proportion occupied by a speaker at a specific frequency point is proportional to an order of value of the frequency point coefficient predicted in the mixed signal. A calculation manner of a frequency point coefficient (P) is as follows: a voice energy value (E) of a speaker at a frequency point is divided by a voice energy value of mixed speakers at the frequency point. It is assumed that there are two people (A and B), the frequency point coefficient of the speaker A at a frequency point is calculated by the following formula:

$$P_A = \frac{E_A}{E_A + E_B}$$

After the frequency point coefficient $P_A$ and the frequency point coefficient $P_B$ at a frequency point are calculated and obtained by the formula, when $P_A$ is greater than $P_B$, the frequency point is dominated by the speaker A, and when $P_A$ is less than $P_B$, the frequency point is dominated by the speaker B.

In the method, especially in a scenario in which a plurality of people simultaneously speaking, by separating the energy information, an energy proportion corresponding to each branch voice at each frequency point may be determined, and the distribution of each branch voice may be determined based on the energy proportion, thereby improving the accuracy and real-time performance of recognizing the quantity of voices.

Step S140. Determine a quantity of branch voices included in the call voice based on the energy proportion of each branch voice at each frequency point.

In an embodiment of this application, after the energy proportion of each branch voice at each frequency point in the call voice is determined, in this embodiment, the quantity of branch voices included in the call voice is determined by averaging based on the energy proportion.

In an embodiment of this application, for the energy proportion of a voice of the speaker A corresponding to each frequency point in each frame, the energy proportion of each frequency point in each frame is averaged to obtain a stable average value of energy within a time period of one frame. Then, it is determined whether a current average value of energy corresponds to a voice of a single speaker or voices of a plurality of speakers based on a set threshold, and finally, information of the quantity of speakers in a current frame is outputted. For example, discrete 0 (a voice of a single speaker) or 1 (voices of a plurality of speakers) corresponding to the current quantity of speakers in each frame respectively may be outputted.

In an embodiment of this application, the collected call voice includes many frames, and there are a plurality of frequency points in one frame. For example, the quantity of frequency points may be the quantity of points obtained by performing Fourier transform, and the quantity of frequency points in a frame is set as f. Fi is an energy proportion corresponding to the $i^{th}$ frequency point of a specific speaker at the frequency points, that is, the frequency point coefficient. An average value of the energy proportion corresponding to the speaker in this frame is obtained as $$\frac{1}{f}\sum_{i=0}^{i=f-1} Fi$$

by averaging. Then, the average value corresponding to each branch voice may be compared with a threshold to determine the quantity of people simultaneously speaking. For example, using two people as an example, because $P_A+P_B=1$, one of $P_A$ and $P_B$ needs to be compared with the threshold. For example, using $P_A$ as an example, when the quantity of people is determined in a voice call, and when the value is 0 or 1, it indicates that current voice energy ($P_B$ or $P_A$) occupies all the voice energy. Therefore, only one person is speaking, that is, B or A is speaking, and the quantity of speakers is 1 in this case; and if the value is 0.5, it indicates that two people are simultaneously speaking, the voice energy is the same in this case, and the quantity of speakers is 2. By comparing the calculated average value of the energy proportion with the set threshold, the current quantity of branch voices may be determined. In practical applications, a specific value of the threshold may be set according to the application scenario.

In this embodiment, the quantity of current branch voices is determined by the threshold detection manner, so that a multi-speaker scenario may be determined within a time period of a very short frame level in real time, and a voice stream may be processed in real time; and many-to-many labels may be used to make full use of voice information to improve the accuracy of scenario detection.

Step S150. Control the voice call by setting a call voice control manner based on the quantity of the branch voices.

In an embodiment of this application, after the quantity of branch voices is determined, a current call state may be determined with reference to the current quantity of branch voices. Then, the voice call is controlled through the set call voice control manner, so as to implement the real-time control of the voice call and improve the accuracy and real-time performance of the voice control.

For example, as shown in FIG. 5, when the quantity of branch voices is more than one, based on the quantity of the branch voices, a background speaker is filtered out, and only an audio stream of the host is extracted. In this case, the quantity of current speakers needs to be detected at a front end. If the quantity of current speakers is greater than 1, voice extraction of the host is enabled; and if it is detected that the current quantity of speakers is 1, the voice extraction is turned off to avoid damage to the voice.

In this embodiment, in a process of voice extraction, based on an energy proportion corresponding to each of the plurality of branch voices respectively at each frequency point, a branch voice corresponding to a maximum value of the energy proportion is recognized as the host voice; frequency information corresponding to the host voice is determined from the energy information; and the host voice is extracted from the call voice based on the frequency information.

Figure 6:
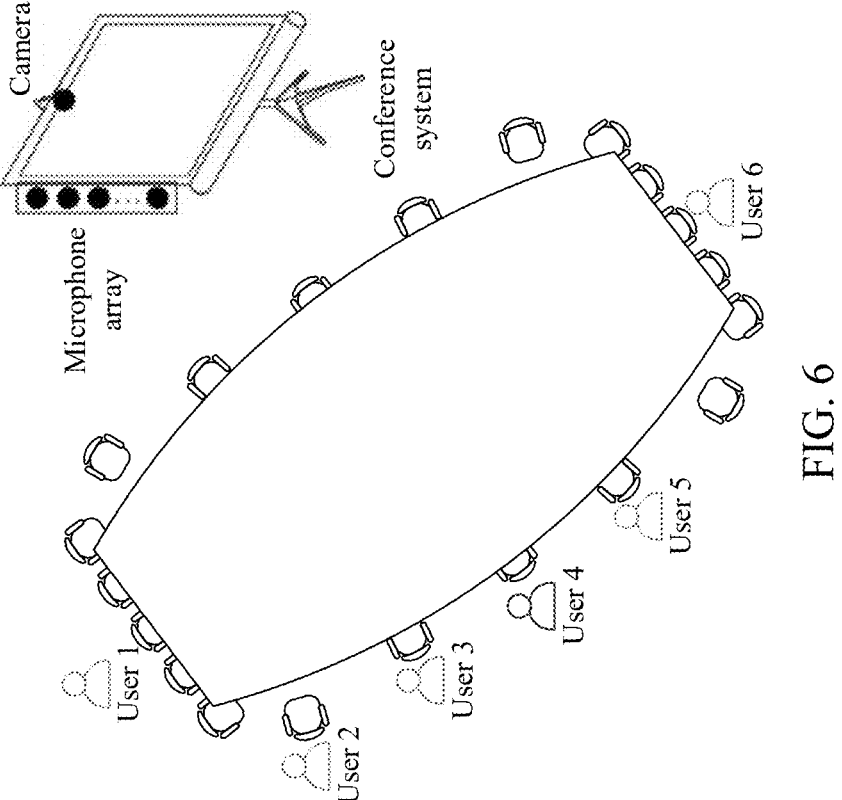
FIG. 6 is a schematic diagram of conference voice extrac-tion according to some embodiments of this application.

As shown in FIG. 6, in a scenario in which a plurality of users are speaking, the host may be determined by the frequency detection manner, as shown in the user 4 in FIG. 6, and the voice of the host is extracted, or the voices of other users are filtered out to cause the voice call to be clearer.

In the manner, the speaking voice of one of the hosts may be extracted and obtained in a scenario in which a plurality of people are speaking, so that the voice during the call is clearer, and the quality and effect of the call are improved.

Figure 7:
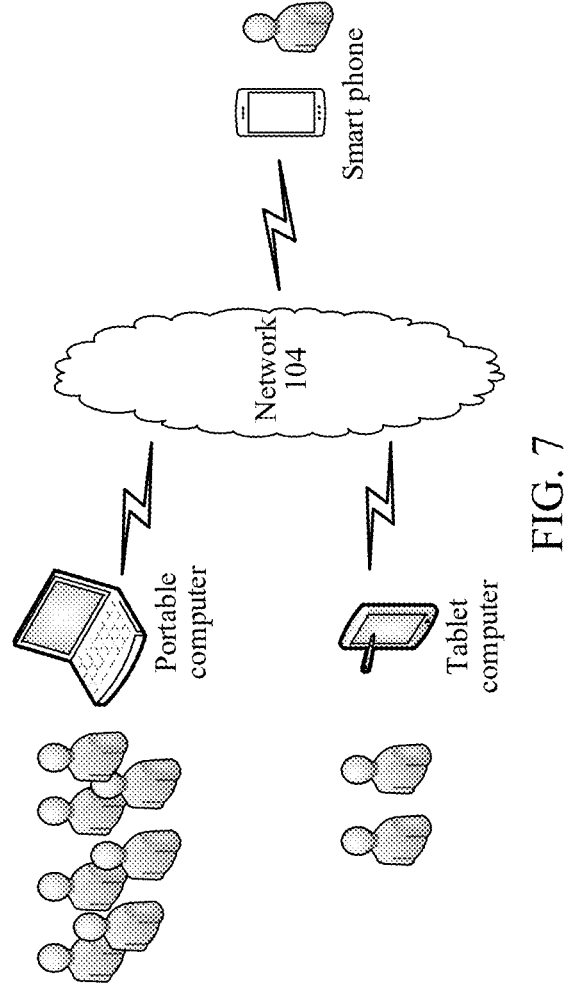
FIG. 7 is a schematic diagram of an application scenario of echo elimination according to some embodiments of this application.

In a case of the voice broadcast shown in FIG. 7, one party of the call hears his own echo from the voice returned by the other party, which leads to a problem that the quality of the call is reduced.

To avoid the situation, as shown in FIG. 8, if it is a single talk scenario in which a communication peer and a current end take turns speaking, that is, the quantity of branch voices is one, based on a set single talk echo processing manner, a return voice of the branch voice is recognized, and a single talk echo of the return voice is eliminated; and in a double talk scenario in which the communication peer and the current end simultaneously speak, that is, the quantity of branch voices is at least two, based on a set double talk echo processing manner, a return voice corresponding to the branch voice is respectively recognized, and a double talk echo of the return voice is eliminated. In the communication system, a signal of the current end is ensured to be retained to the greatest extent in an echo elimination process.

In the solution, the call voice is obtained in real time during the call, and frequency domain transformation is performed on the call voice to determine the corresponding energy information of the call voice in the frequency domain. Then, separation processing is performed on the energy information based on the neural network, and the energy proportion of each branch voice included in the call voice in the call voice is determined, so as to determine the quantity of branch voices included in the call voice based on the energy proportion. Finally, based on the quantity of branch voices, the voice call is controlled by setting the call voice control manner, thereby implementing the real-time detection of the quantity of people during the voice call and the real-time control of the voice call. In this way, the accuracy of detecting the quantity of people in the voice call is ensured, and the efficiency of recognizing the quantity of people in the voice call and the efficiency of controlling the voice call are simultaneously improved.

In an embodiment of this application, as shown in FIG. 9, the step S120 of performing the frequency domain transformation on the call voice to determine a process of the energy information corresponding to the call voice in the frequency domain includes step S1210 to step S1230, and the details are as follows:

Step S1210. Perform framing on the call voice to obtain at least one audio frame of the call voice;

Step S1220. Perform frequency domain transformation on each audio frame of the call voice to obtain a voice energy spectrum of the frequency domain; and Step S1230. Determine energy information corresponding to each frequency point of the call voice in the frequency domain based on the voice energy spectrum.

In an embodiment of this application, the performing frequency domain transformation on each frame of voice information to obtain a voice energy spectrum of the frequency domain includes: performing Fourier transform or other manners of converting a time domain to a frequency domain on each audio frame of the call voice in the frequency domain to obtain a voice energy spectrum of the voice information corresponding to the frequency domain.

In this embodiment, the step S1230 of determining the energy information corresponding to each frequency point of the call voice in the frequency domain based on a voice energy spectrum includes: performing modulo processing on an amplitude corresponding to each frequency point in the voice energy spectrum to obtain an amplitude spectrum corresponding to the voice energy spectrum; and calculating a square value of the amplitude spectrum, and performing a logarithmic operation on the square value to generate the energy information corresponding to each frequency point of the call voice in the frequency domain.

Figure 10:
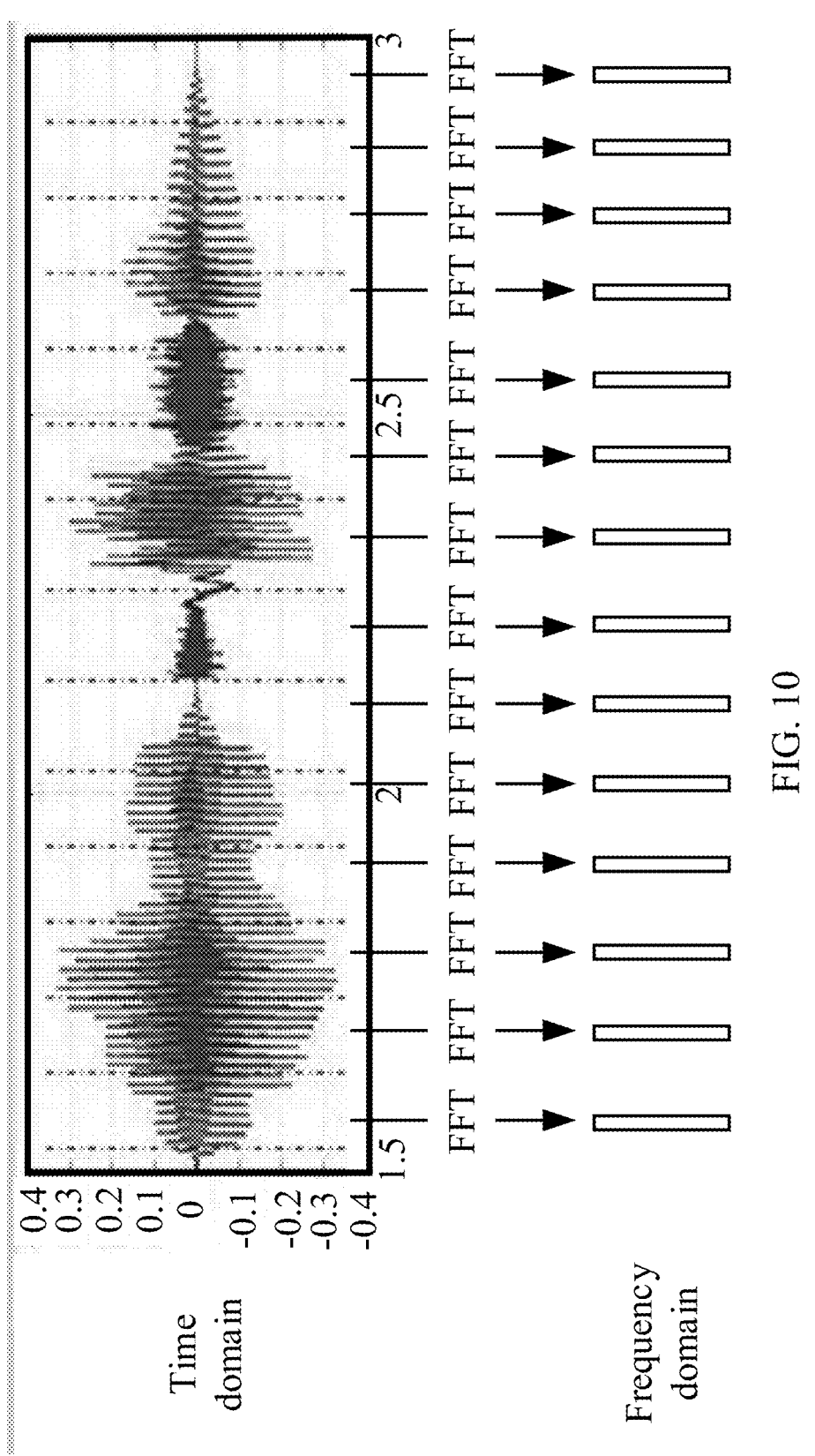
FIG. 10 is a schematic flowchart of extracting energy information according to some embodiments of this application.

As shown in FIG. 10, in an embodiment of this application, framing and windowing are performed on the collected time domain voice; and then, N-point Fourier transform is respectively performed on each frame to calculate a Fourier transform coefficient of the N frequency points obtained by the Fourier transform. Modulo processing is performed on each frame to obtain an amplitude spectrum of the frequency domain, then a logarithm of the square of the obtained amplitude spectrum is calculated to obtain a logarithmic energy spectrum, and then energy information of the voice on N frequency points may be obtained.

In an embodiment of this application, the neural network includes a long-short-term memory neural network; and the step S130 of performing separation processing on the energy information based on the neural network to determine the energy proportion of each branch voice included in the call voice in the call voice includes: inputting the energy information into a preset voice separation model, performing convolution processing based on the long short-term memory neural network, and determining the energy proportion of each branch voice included in the call voice at each frequency point corresponding to the frequency point.

In an embodiment of this application, as shown in FIG. 11, in a process of training the voice separation model, the method further includes:

Step S1110. Obtain a first voice sample corresponding to a single voice, and a second voice sample corresponding to a mixed voice including the single voice;

Step S1120. Extract a first voice feature from the first voice sample, and extract a second voice feature from the second voice sample;

Step S1130. Input the second voice feature into a voice separation model constructed based on the long short-term memory artificial neural network, and determine a predicted voice separated from the second voice feature, and a predicted energy proportion corresponding to the predicted voice in the second voice sample; and Step S1140. Update parameters of the voice separation model according to a comparison result between an actual energy proportion of the first voice sample in the second voice sample and the predicted energy proportion.

In an embodiment of this application, first, a dataset used for training is constructed to obtain two audio libraries, a single speaker voice corpus and a multi-speaker voice corpus. The single-speaker voice corpus includes a first voice sample corresponding to a single voice. The multi-speaker voice corpus refers to randomly extracting a plurality of single speaker voice segments for superposition, then, extracting logarithmic energy spectrum in the voice from the two databases through signal preprocessing, then, obtaining each frequency point coefficient through a separation model, and then obtaining a separated voice through post-processing. In this embodiment, the extracted logarithmic energy spectrum feature is used as an input, and the feature is inputted into a separation model including a two-layer long short-term memory (LSTM) network and an output layer to obtain a frequency point coefficient.

A reason for using the LSTM network in this embodiment is that the LSTM network not only considers the input at a current moment, but also gives the network a memory function for previous content. In addition, an added input gate, an output gate, a forget gate, and a cell state unit in the network structure in this embodiment cause the time series modeling capability of the LSTM to be significantly improved, so that more information is memorized, and long-term dependencies in data are effectively captured.

In the training of the whole model, a training set includes voices of a plurality of speakers and a voice of a single speaker. The voices of a plurality of speakers are obtained by adding a plurality of voices of a single speaker, and the voice of the single speaker may be regarded as a mixture with silence. A voice feature a is extracted from the mixed voice, a voice feature b is extracted from a corresponding clean voice, a feature vector a is used as a training input, a feature vector b is used as a training target, and frequency point coefficients m and n are outputted by a model. The separated voice is obtained through post-processing, an error between the separated voice and the clean voice is used for guiding the training of the LSTM model, and parameters in the LSTM model are adjusted to obtain a final separation model, thereby causing the obtained separation model to be more accurate and complete.

In the voice separation model obtained in the training process, a multi-speaker scenario may be determined within a very short time period at a frame level in real time, and a voice stream is processed in real time; and in addition, based on a label corresponding to each frequency point in the frame, in a manner of a plurality of frequency points corresponding to a plurality of labels, the voice information may be fully used to improve the accuracy of scenario detection.

Further, in this embodiment, in step S1130, in a process of inputting the second voice feature into a voice separation model constructed based on the long short-term memory artificial neural network, and determining a predicted voice separated from the second voice feature, the obtained frequency point coefficient is multiplied by a spectrum of a mixed voice, and then a separated voice signal may be obtained through inverse Fourier transform, in combination with a phase of a mixed signal.

The step S140 of determining a quantity of branch voices included in the call voice based on the energy proportion of each branch voice at each frequency point includes: calculating an average value of the energy proportion of each branch voice based on the energy proportion of the branch voice included in the call voice corresponding to each frequency point; and determining the quantity of branch voices included in the call voice based on the average value of each branch voice and a set threshold.

In an embodiment of this application, the collected call voice includes many frames, and there are a plurality of frequency points in one frame. The quantity of frequency points in a frame is set as f. Fi is an energy proportion corresponding to the i$^{th}$ frequency point of a specific speaker in the frequency points, that is, the frequency point coefficient. An average value of the energy proportion corresponding to the speaker in this frame is obtained as $$\frac{1}{f}\sum_{i=0}^{i=f-1}Fi$$

by averaging.

In an embodiment of this application, the determining the quantity of branch voices included in the call voice based on the average value of each branch voice and the set threshold includes: determining that the quantity of the branch voices is more than one when an absolute value of a difference between the average value of each branch voice and the set threshold is less than a difference threshold; and determining that the quantity of the branch voices is one when the absolute value of the difference between the average value of each branch voice and the set threshold is greater than or equal to the difference threshold.

Specifically, in this embodiment, using two people simultaneously speak as an example, when an average value is closer to 0 or closer to 1, the probability of a single speaker speaking is greater, and the closer the average value is to 0.5, the probability of two speakers simultaneously speaking is greater. A threshold is determined according to a specific task. For example, in an extraction algorithm of a host, to avoid the damage to the voice made by the algorithm in a voice of a single speaker, the false detection rate of the voice of the single speaker needs to be determined to be low, and a threshold may be set close to 0 or 1 in this case.

Figure 12:
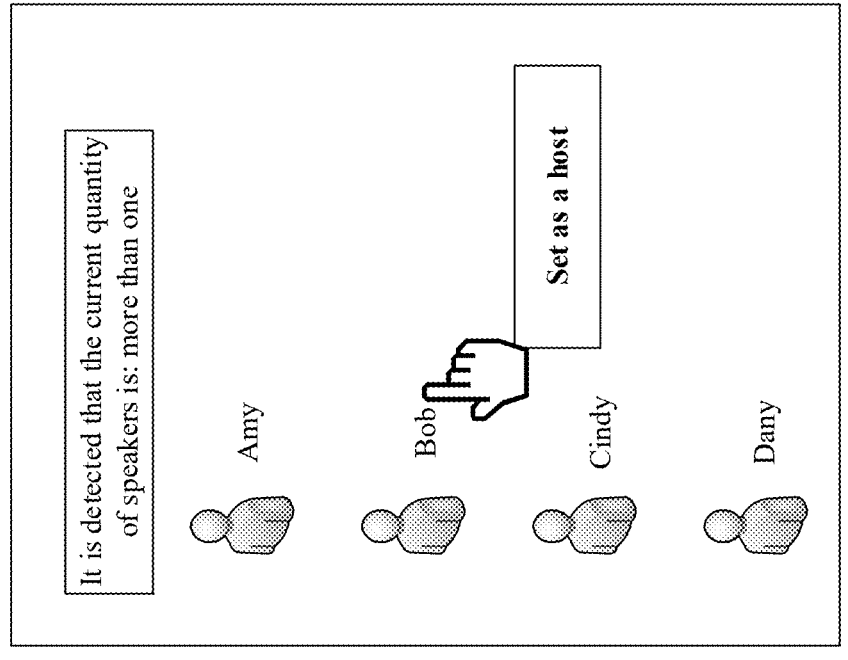
FIG. 12 is a schematic diagram of an interface for setting a host according to some embodiments of this application.

As shown in FIG. 12, in the actual conference application scenario, when it is detected that the current quantity of speakers is more than one, the detected speaker or participant may be displayed in the interface, and in response to a user-triggered instruction for setting a host, one or more people among the speakers are set as the host, so as to filter the audio of the other people to ensure the quality of the call in the conference.

Figure 13:
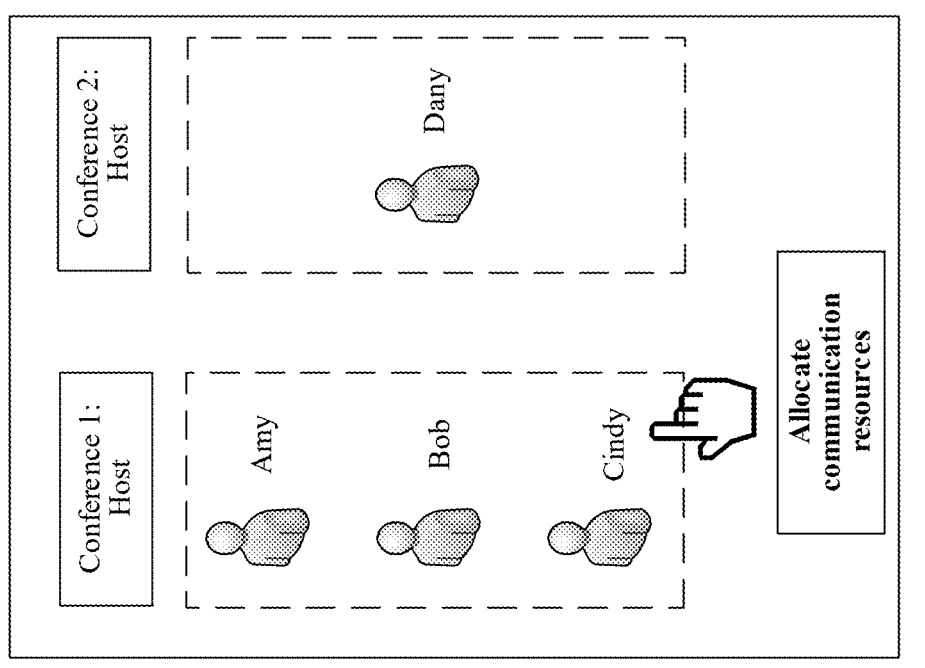
FIG. 13 is a schematic diagram of an interface for allocating communication resources according to some embodiments of this application.

As shown in FIG. 13, for a session control server, when there are a plurality of simultaneous voice sessions, more communication resources may be allocated to a conference with a large quantity of hosts to ensure the quality of the call.

The following describes apparatus embodiments of this application, and the apparatus embodiments may be used for performing the voice call control method in the foregoing embodiment of this application. It is to be understood that the apparatus may be a computer program (including program code) run in a computer device. For example, the apparatus is an application software; and The apparatus may be configured to perform corresponding steps in the methods provided in this embodiment of this application. For details not disclosed in the apparatus embodiments of this application, reference may be made to the foregoing voice call control method embodiments of this application.

Figure 14:
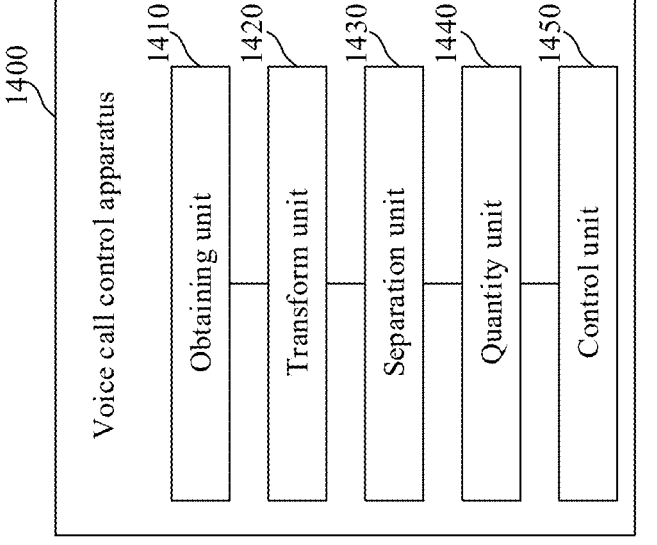
FIG. 14 is a schematic block diagram of a voice call control apparatus according to some embodiments of this application.

FIG. 14 is a schematic block diagram of a voice call control apparatus according to some embodiments of this application.

As shown in FIG. 14, the voice call control apparatus 1400 according to an embodiment of this application includes: an obtaining unit 1410, configured to obtain a mixed call voice; a transform unit 1420, configured to perform frequency domain transformation on the call voice to determine energy information corresponding to each frequency point of the call voice; a separation unit 1430, configured to perform separation processing on the energy information at each frequency point based on a neural network to determine an energy proportion of each branch voice included in the call voice at each frequency point in the call voice; a quantity unit 1440, configured to determine a quantity of branch voices included in the call voice based on the energy proportion of each branch voice at each frequency point; and a control unit 1450, configured to control the voice call by setting a call voice control manner based on the quantity of the branch voices.

In some embodiments of this application, based on the foregoing solution, the transform unit 1420 includes: a framing unit, configured to perform framing on the call voice to obtain at least one frame of voice information; a frequency domain transform unit, configured to perform frequency domain transformation on each audio frame of the call voice to obtain a voice energy spectrum of the frequency domain; and an energy unit, configured to determine energy information corresponding to each frequency point of the call voice in the frequency domain based on the voice energy spectrum.

In some embodiments of this application, based on the foregoing solution, the frequency domain transform unit is configured to: perform Fourier transform on each audio frame of the call voice in the frequency domain to obtain a voice energy spectrum of each audio frame of the call voice corresponding to the frequency domain.

In some embodiments of this application, based on the foregoing solution, the energy unit is configured to: perform modulo processing on an amplitude corresponding to each frequency point in the voice energy spectrum to obtain an amplitude spectrum corresponding to the voice energy spectrum; and calculate a square value of the amplitude spectrum, and perform a logarithmic operation on the square value to generate the energy information corresponding to each frequency point of the call voice in the frequency domain.

In some embodiments of this application, based on the foregoing solution, the neural network includes a long-short-term memory neural network; and the separation unit 1430 is configured to: input the energy information into a preset voice separation model, perform convolution processing based on the long short-term memory neural network, and determine a branch voice corresponding to each frequency point; and determine an energy proportion of each branch voice at the frequency point at each frequency point based on the energy information of each branch voice corresponding to each frequency point at the frequency point.

In some embodiments of this application, based on the foregoing solution, the voice call control apparatus 1400 further includes an update unit, configured to: obtain a first voice sample corresponding to a single voice, and a second voice sample corresponding to a mixed voice including the single voice; extract a first voice feature from the first voice sample, and extract a second voice feature from the second voice sample; input the second voice feature into a voice separation model constructed based on the long short-term memory artificial neural network, and determine a predicted voice separated from the second voice feature, and a predicted energy proportion corresponding to the predicted voice in the second voice sample; and update parameters of the voice separation model according to a comparison result between an actual energy proportion of the first voice sample in the second voice sample and the predicted energy proportion.

In some embodiments of this application, based on the foregoing solution, the quantity unit 1440 includes: an average unit, configured to calculate, for each branch voice, based on the energy proportion corresponding to the branch voice at each frequency point, an average value of the energy proportion of the branch voice; and a voice quantity unit, configured to determine the quantity of branch voices included in the call voice based on the average value of each branch voice and a set threshold.

In some embodiments of this application, based on the foregoing solution, the voice quantity unit includes: a first quantity unit, configured to determine that the quantity of the branch voices is more than one when an absolute value of a difference between the average value of each branch voice and the set threshold is less than a difference threshold; and a second quantity unit, configured to determine that the quantity of the branch voices is one when the absolute value of the difference between the average value of each branch voice and the set threshold is greater than or equal to the difference threshold.

In some embodiments of this application, based on the foregoing solution, the control unit 1450 includes an extraction unit, configured to extract a host voice based on a set voice extraction manner.

In some embodiments of this application, based on the foregoing solution, the extraction unit is configured to recognize, based on an energy proportion corresponding to each of the plurality of branch voices respectively at each frequency point, a branch voice corresponding to a maximum value of the energy proportion as the host voice; determine frequency information corresponding to the host voice from the energy information; and extract the host voice from the call voice based on the frequency information.

In some embodiments of this application, based on the foregoing solution, the quantity of the branch voices is one or at least two, and the control unit 1450 is configured to: when the quantity of the branch voices is one, based on a set single talk echo processing manner, recognize a return voice of the branch voice, and eliminate a single talk echo of the return voice; and when the quantity of the branch voices is at least two, based on a set double talk echo processing manner, respectively recognizing a return voice corresponding to each of the branch voices, and eliminating a double talk echo of the return voice.

Figure 15:
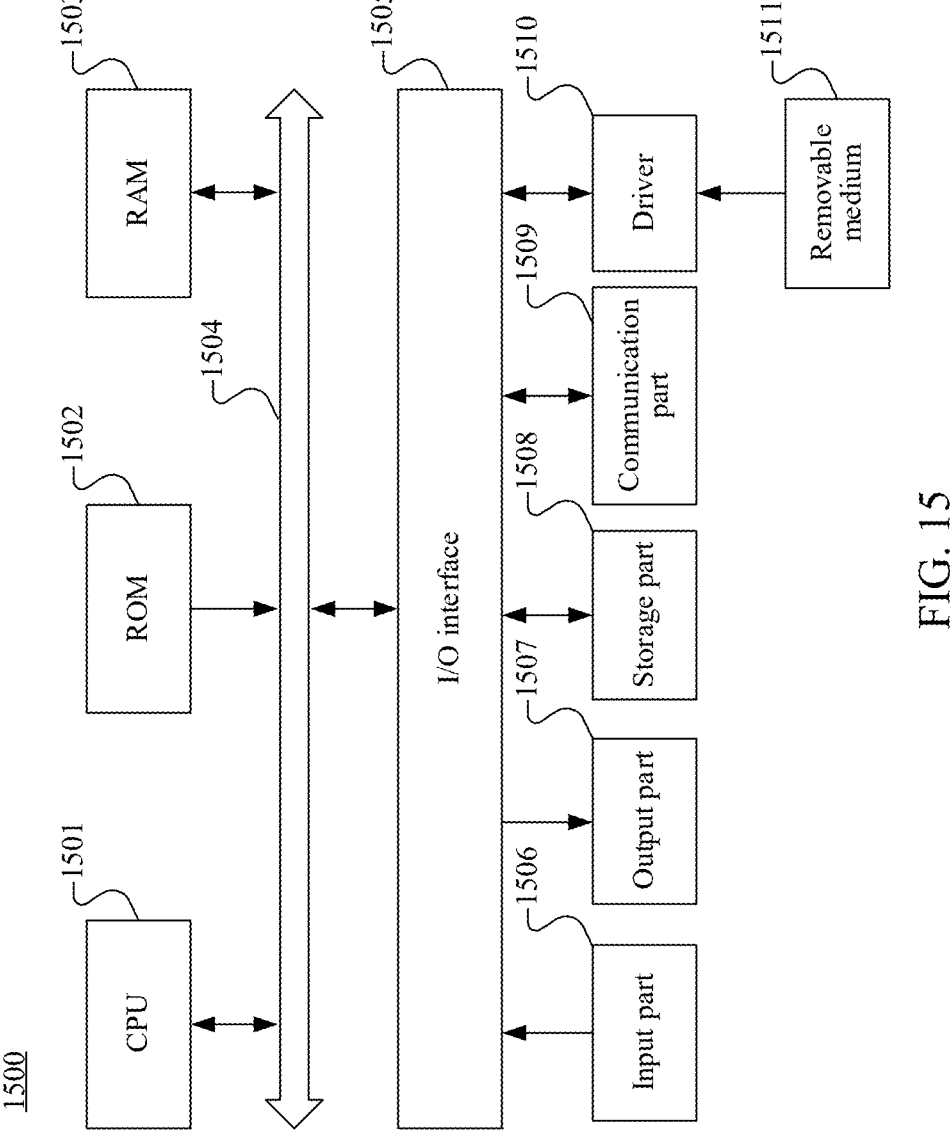
FIG. 15 is a schematic structural diagram of a computer system adapted to implement an electronic device according to an embodiment of this application.

FIG. 15 is a schematic structural diagram of a computer system adapted to implement an electronic device according to an embodiment of this application.

A computer system 1500 of the electronic device shown in FIG. 15 is merely an example, and does not constitute any limitation on functions and use ranges of the embodiments of this application.

As shown in FIG. 15, the computer system 1500 includes a central processing unit (CPU) 1501, which may perform various suitable actions and processing based on a program stored in a read-only memory (ROM) 1502 or a program loaded from a storage part 1508 into a random access memory (RAM) 1503, for example, perform the method described in the foregoing embodiments. The RAM 1503 further stores various programs and data required for operating the system. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like, an output part 1507 including a cathode ray tube (CRT), a liquid crystal display (LCD), a speaker, or the like, a storage part 1508 including a hard disk, or the like, and a communication part 1509 including a network interface card such as a local area network (LAN) card or a modem. The communication part 1509 performs communication processing by using a network such as the Internet. A driver 1510 is also connected to the I/O interface 1505 as required. A removable medium 1511, such as a magnetic disk, an optical disc, a magneto-optical disk, or a semiconductor memory, is installed on the driver 1510 as required, so that a computer program read therefrom is installed into the storage part 1508 as required.

Particularly, according to an embodiment of this application, the processes described above by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, by using the communication part 1509, the computer program may be downloaded and installed from a network, and/or installed from the removable medium 1511. When the computer program is executed by the CPU 1501, the various functions defined in the system of this application are executed.

The computer-readable medium shown in the embodiments of this application may be a computer-readable signal medium or a computer-readable storage medium or any combination thereof. The computer-readable storage medium is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the method provided in the foregoing various implementations.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

It is to be understood that this application is not limited to the precise structures described above and shown in the accompanying drawings, and various modifications and changes may be made without departing from the scope of this application. The scope of this application is topic only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A real-time voice call control method performed by an electronic device, the method comprising:

obtaining a mixed call voice in real time during a cloud-based conference call, the mixed call voice comprising multiple branch voices speaking simultaneously;

determining energy information corresponding to each frequency point of the call voice in a frequency domain;

inputting the energy information into a preset voice separation model based on a long short-term memory neural network to determine a plurality of frequency point coefficients of each branch voice in the mixed call voice at a plurality of frequency points, wherein the frequency point coefficient of a branch voice at a frequency point is a voice energy value of a speaker generating the branch voice at the frequency point divided by a voice energy value of multiple speakers in the mixed call voice at the frequency point;

determining, for each branch voice in the mixed call voice, a distribution of an energy proportion of the branch voice at each frequency point of the plurality of frequency points in comparison to the total energy of the frequency point in accordance with a calculation of an average value of the plurality of determined frequency point coefficients of the branch voice;

displaying identities of multiple speakers corresponding to the multiple branch voices on a display of the electronic device when an absolute value of a difference between the average value of each branch voice and a preset threshold is less than a difference threshold; and extracting a host voice from the mixed call voice in real time during the cloud-based conference call in response to a user selection of one of the identities of multiple speakers on the display of the electronic device.

2. The method according to claim 1, wherein the determining energy information corresponding to each frequency point of the call voice in a frequency domain comprises:

performing framing on the call voice to obtain at least one audio frame of the mixed call voice;

performing frequency domain transformation on each audio frame of the call voice to obtain a voice energy spectrum of the audio frame in the frequency domain; and determining the energy information corresponding to each frequency point of the call voice in the frequency domain based on the voice energy spectrum of the audio frame.

3. The method according to claim 1, wherein the preset voice separation model is generated by:

obtaining a first voice sample corresponding to a single voice, and a second voice sample corresponding to a mixed voice comprising the single voice;

extracting a first voice feature from the first voice sample, and extracting a second voice feature from the second voice sample;

inputting the second voice feature into a voice separation model constructed based on the long short-term memory artificial neural network, and determining a predicted voice separated from the second voice feature, and a predicted energy proportion corresponding to the predicted voice in the second voice sample; and updating parameters of the voice separation model according to a comparison result between an actual energy proportion of the first voice sample in the second voice sample and the predicted energy proportion.

4. An electronic device, comprising:

one or more processors; and a storage apparatus, configured to store one or more programs, the one or more programs, when executed by the one or more processors, causing the electronic device to implement a real-time voice call control method including:

obtaining a mixed call voice in real time during a cloud-based conference call, the mixed call voice comprising multiple branch voices speaking simultaneously;

determining energy information corresponding to each frequency point of the call voice in a frequency domain;

inputting the energy information into a preset voice separation model based on a long short-term memory neural network to determine a plurality of frequency point coefficients of each branch voice in the mixed call voice at a plurality of frequency points, wherein the frequency point coefficient of a branch voice at a frequency point is a voice energy value of a speaker generating the branch voice at the frequency point divided by a voice energy value of multiple speakers in the mixed call voice at the frequency point;

determining, for each branch voice in the mixed call voice, a distribution of an energy proportion of the branch voice at each frequency point of the plurality of frequency points in comparison to the total energy of the frequency point in accordance with a calculation of an average value of the plurality of determined frequency point coefficients of the branch voice;

displaying identities of multiple speakers corresponding to the multiple branch voices on a display of the electronic device when an absolute value of a difference between the average value of each branch voice and a preset threshold is less than a difference threshold; and extracting a host voice from the mixed call voice in real time during the cloud-based conference call in response to a user selection of one of the identities of multiple speakers on the display of the electronic device.

5. The electronic device according to claim 4, wherein the determining energy information corresponding to each frequency point of the call voice in a frequency domain comprises:

performing framing on the call voice to obtain at least one audio frame of the call voice;

performing frequency domain transformation on each audio frame of the call voice to obtain a voice energy spectrum of the audio frame in the frequency domain; and determining the energy information corresponding to each frequency point of the call voice in the frequency domain based on the voice energy spectrum of the audio frame.

6. The electronic device according to claim 4, wherein the preset voice separation model is generated by:

obtaining a first voice sample corresponding to a single voice, and a second voice sample corresponding to a mixed voice comprising the single voice;

extracting a first voice feature from the first voice sample, and extracting a second voice feature from the second voice sample;

inputting the second voice feature into a voice separation model constructed based on the long short-term memory artificial neural network, and determining a predicted voice separated from the second voice feature, and a predicted energy proportion corresponding to the predicted voice in the second voice sample; and updating parameters of the voice separation model according to a comparison result between an actual energy proportion of the first voice sample in the second voice sample and the predicted energy proportion.

7. A non-transitory computer-readable storage medium, storing a computer program, the computer program, when executed by a processor of an electronic device, causing the electronic device to implement a real-time voice call control method including:

obtaining a mixed call voice in real time during a cloud-based conference call, the mixed call voice comprising multiple branch voices speaking simultaneously;

determining energy information corresponding to each frequency point of the call voice in a frequency domain;

inputting the energy information into a preset voice separation model based on a long short-term memory neural network to determine a plurality of frequency point coefficients of each branch voice in the mixed call voice at a plurality of frequency points, wherein the frequency point coefficient of a branch voice at a frequency point is a voice energy value of a speaker generating the branch voice at the frequency point divided by a voice energy value of multiple speakers in the mixed call voice at the frequency point;

determining, for each branch voice in the mixed call voice, a distribution of an energy proportion of the branch voice at each frequency point of the plurality of frequency points in comparison to the total energy of the frequency point in accordance with a calculation of an average value of the plurality of determined frequency point coefficients of the branch voice;

displaying identities of multiple speakers corresponding to the multiple branch voices on a display of the electronic device when an absolute value of a difference between the average value of each branch voice and a preset threshold is less than a difference threshold; and extracting a host voice from the mixed call voice in real time during the cloud-based conference call in response to a user selection of one of the identities of multiple speakers on the display of the electronic device.

8. The non-transitory computer-readable storage medium according to claim 7, wherein the determining energy information corresponding to each frequency point of the call voice in a frequency domain comprises:

performing framing on the call voice to obtain at least one audio frame of the call voice;

performing frequency domain transformation on each audio frame of the call voice to obtain a voice energy spectrum of the audio frame in the frequency domain; and determining the energy information corresponding to each frequency point of the call voice in the frequency domain based on the voice energy spectrum of the audio frame.

9. The non-transitory computer-readable storage medium according to claim 7, wherein the preset voice separation model is generated by:

obtaining a first voice sample corresponding to a single voice, and a second voice sample corresponding to a mixed voice comprising the single voice;

extracting a first voice feature from the first voice sample, and extracting a second voice feature from the second voice sample;

inputting the second voice feature into a voice separation model constructed based on the long short-term memory artificial neural network, and determining a predicted voice separated from the second voice feature, and a predicted energy proportion corresponding to the predicted voice in the second voice sample; and updating parameters of the voice separation model according to a comparison result between an actual energy proportion of the first voice sample in the second voice sample and the predicted energy proportion.

* * * * *